US011176505B2

(12) United States Patent
Kurian et al.

(10) Patent No.: US 11,176,505 B2
(45) Date of Patent: Nov. 16, 2021

(54) MULTI-CHANNEL TRACKING AND CONTROL SYSTEM

(71) Applicant: Bank of America Corporation, Charlotte, NC (US)

(72) Inventors: Manu Kurian, Dallas, TX (US); Matthew E. Carroll, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 94 days.

(21) Appl. No.: 16/736,141

(22) Filed: Jan. 7, 2020

(65) Prior Publication Data

US 2021/0209534 A1    Jul. 8, 2021

(51) Int. Cl.
| G06Q 10/06 | (2012.01) |
| G06Q 10/08 | (2012.01) |
| G06N 20/00 | (2019.01) |
| G06Q 30/06 | (2012.01) |

(52) U.S. Cl.
CPC ....... *G06Q 10/06315* (2013.01); *G06N 20/00* (2019.01); *G06Q 10/087* (2013.01); *G06Q 10/0833* (2013.01); *G06Q 30/0635* (2013.01)

(58) Field of Classification Search
CPC .. G06N 20/00; G06Q 10/0833; G06Q 10/087; G06Q 30/0635
USPC ...................................................... 705/7.25
See application file for complete search history.

(56) References Cited

U.S. PATENT DOCUMENTS

| 9,292,832 | B2 | 3/2016 | Goel et al. |
| 9,413,827 | B2 | 8/2016 | Sharma et al. |
| 9,438,440 | B2 | 9/2016 | Burns et al. |
| 9,558,524 | B2 | 1/2017 | Madhu et al. |
| 9,680,726 | B2 | 6/2017 | Sharma et al. |
| 9,699,659 | B2 | 7/2017 | Zehavi et al. |
| 9,721,296 | B1 | 8/2017 | Chrapko |

(Continued)

FOREIGN PATENT DOCUMENTS

CN      108073829 A      5/2018

OTHER PUBLICATIONS

Fatima et al "Product recommendation based on shared customer's behaviour", Oct. 2016, ScienceDirect, pp. 137-138 (Year: 2016).*

*Primary Examiner* — Romain Jeanty

(74) *Attorney, Agent, or Firm* — Banner & Witcoff, Ltd.; Michael A. Springs

(57) ABSTRACT

Arrangements for providing multi-channel tracking and control are provided. In some examples, a request for a quantity of product may be received. The request may be processed and the order transmitted to a destination. During shipping, tracking of the order may be performed to determine whether an order has arrived at a destination. In some examples, quality data may be captured at the destination to determine whether a portion of the order was damaged or destroyed during shipping. In some arrangements, upon detecting delivery of the order the system may generate one or more instructions to update an inventory of the requesting entity based on delivery of the order. In some examples, machine learning may be used to predict when an entity may submit a subsequent request for product, a recommended amount of product, and the like. This information may be transmitted to a requesting entity to simplify future processing requests.

18 Claims, 14 Drawing Sheets

(56) References Cited

U.S. PATENT DOCUMENTS

| | | | |
|---|---|---|---|
| 9,853,826 B2 | 12/2017 | Shuman et al. | |
| 9,900,171 B2 | 2/2018 | Guedalia et al. | |
| 10,015,293 B2 | 7/2018 | Seed et al. | |
| 10,051,068 B2 | 8/2018 | Sharma et al. | |
| 10,242,336 B1* | 3/2019 | Agarwal | G06Q 10/083 |
| 10,282,766 B2* | 5/2019 | Rellas | G06Q 30/0261 |
| 10,467,559 B1* | 11/2019 | Svenson | G06Q 20/209 |
| 2008/0004886 A1* | 1/2008 | Hames | G06F 21/10 |
| | | | 705/26.1 |
| 2010/0161365 A1* | 6/2010 | Lokowandt | G06Q 30/0601 |
| | | | 705/7.31 |
| 2015/0058174 A1* | 2/2015 | Dumon | G06F 16/90335 |
| | | | 705/26.64 |
| 2015/0363782 A1 | 12/2015 | Ronca et al. | |
| 2015/0363783 A1 | 12/2015 | Ronca et al. | |
| 2016/0048898 A1* | 2/2016 | Irish | G06Q 30/0625 |
| | | | 705/26.62 |
| 2017/0345019 A1 | 11/2017 | Radocchia et al. | |
| 2018/0108024 A1 | 4/2018 | Greco et al. | |
| 2018/0137457 A1 | 5/2018 | Sachs et al. | |
| 2018/0183587 A1 | 6/2018 | Won et al. | |

\* cited by examiner

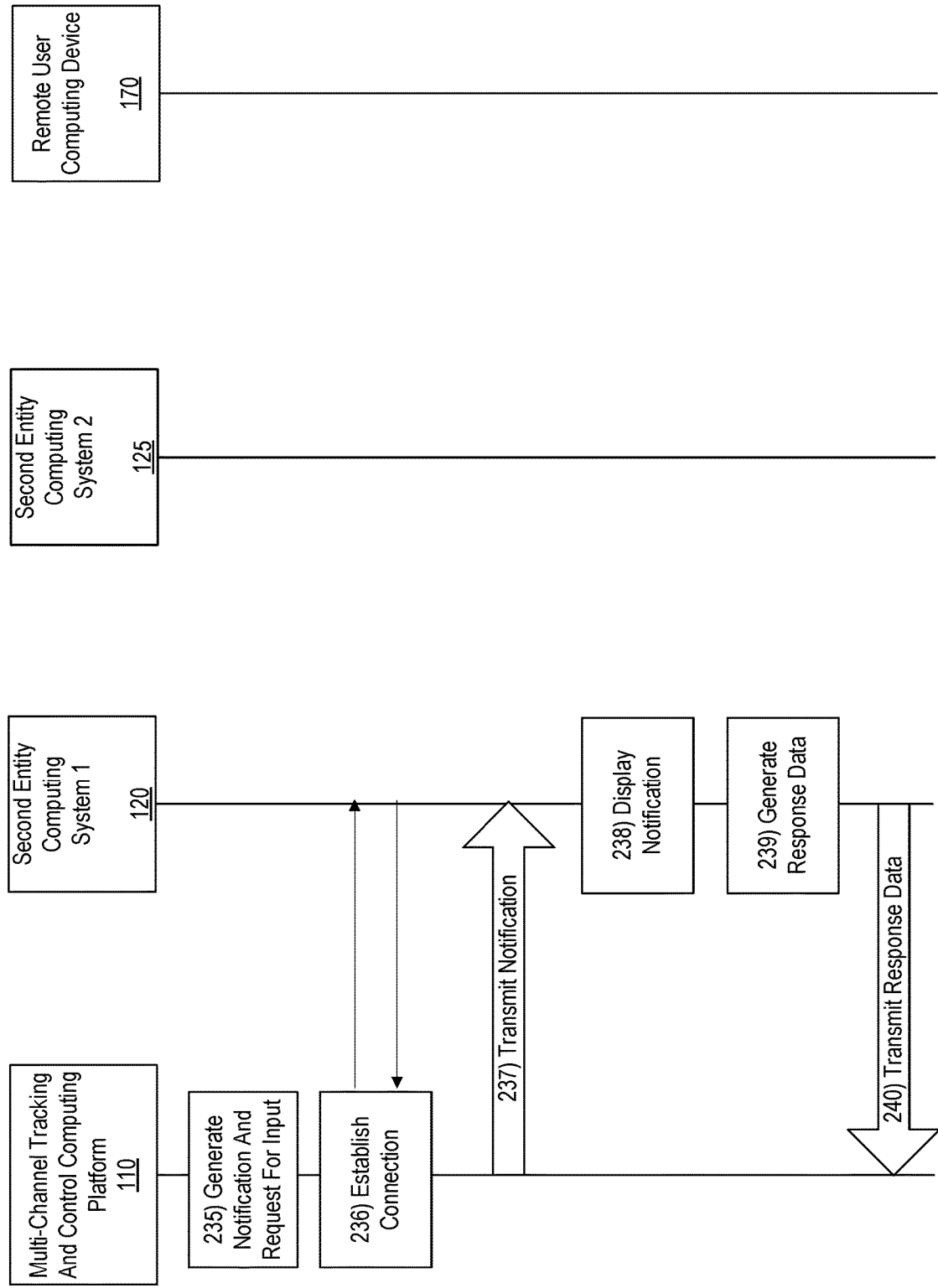

MULTI-CHANNEL TRACKING AND CONTROL SYSTEM

BACKGROUND

Aspects of the disclosure relate to electrical computers, systems, and devices for multi-channel tracking and control. In particular, one or more aspects of the disclosure relate to using providing multi-channel tracking and control of order processing.

Many organizations use different computing systems, applications, and the like, to control and/or monitor different business functions. These arrangements can be inefficient and can lead to inaccuracies, as well as a lack of understanding of an overall picture for the business. In particular, shipping and receiving functions can be inefficient when different systems are controlling purchase orders, payment processing, inventory, and the like. Accordingly, it would be advantageous to provide multi-channel tracking and control of various functions to improve efficiency and retain control of various processes.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with integrating data from a plurality of different computing devices or systems related to one or more functions or processes.

In some examples, a request for a quantity of product may be received. The request may be received by a computing platform in communication with a plurality of different computing systems or devices at various entities. The request may be processed and the order transmitted to a destination. During shipping, tracking of the order may be performed to determine whether an order has arrived at a destination. In some examples, quality data may be captured at the destination to determine whether a portion of the order was damaged or destroyed during shipping.

In some arrangements, upon detecting delivery of the order and processing any quality data, the system may facilitate processing of a transaction associated with the order. Further, the system may generate one or more instructions to update an inventory of the requesting entity based on delivery of the order.

In some examples, machine learning may be used to predict when an entity may submit a subsequent request for product, a recommended amount of product, and the like. This information may be transmitted to a requesting entity to simplify future processing requests.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for implementing multi-channel tracking and control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, maintaining understanding and control while efficiently performing a plurality of processes or functions can be challenging. The user of various systems and devices to execute different processes can lead to inefficiencies and inaccuracies. Accordingly, aspects described herein relate to providing multi-channel tracking and control of various processes.

In some examples, requests for product may be received by a multi-channel tracking and control system and from one or more entities different from the entity implementing the multi-channel tracking and control system. The requests may be processed and an order may be shipped to the requesting entity. The multi-channel tracking and control system may facilitate fulfillment of the order, may track progress of the order to a destination, and the like. Upon delivery, quality data related to the order may be captured and transmitted to the multi-channel tracking and control system for processing.

After confirming delivery and/or evaluating quality, the multi-channel tracking and control computing platform may facilitate payment associated with the order, including any modifications to payment terms based on determined quality of the product. Further, the multi-channel tracking and control system may generate an instruction to update an inventory system of the requesting entity, may transmit the instruction and may cause the instruction to execute on the entity system in order to update inventory.

In some examples, machine learning may be used to predict when an entity should request additional product, an amount or quantity or product to request, and the like. These predictions may be generated and transmitted to an entity for consideration and acceptance, as desired.

These and various other arrangements will be discussed more fully below.

Figure 1A:
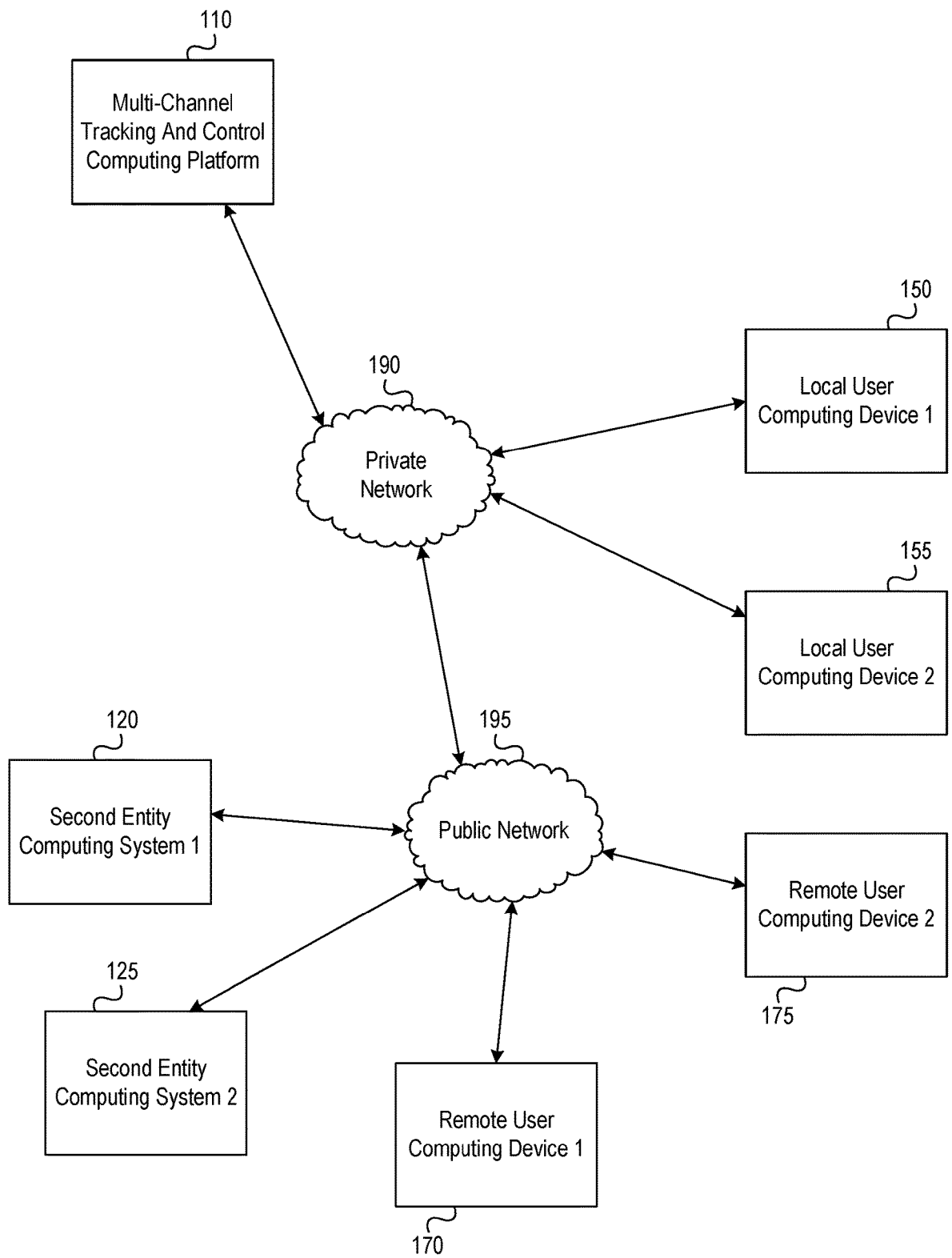
FIGS. 1A and 1B depict an illustrative computing environment for implementing multi-channel tracking and control functions in accordance with one or more aspects described herein.
Figure 1B:
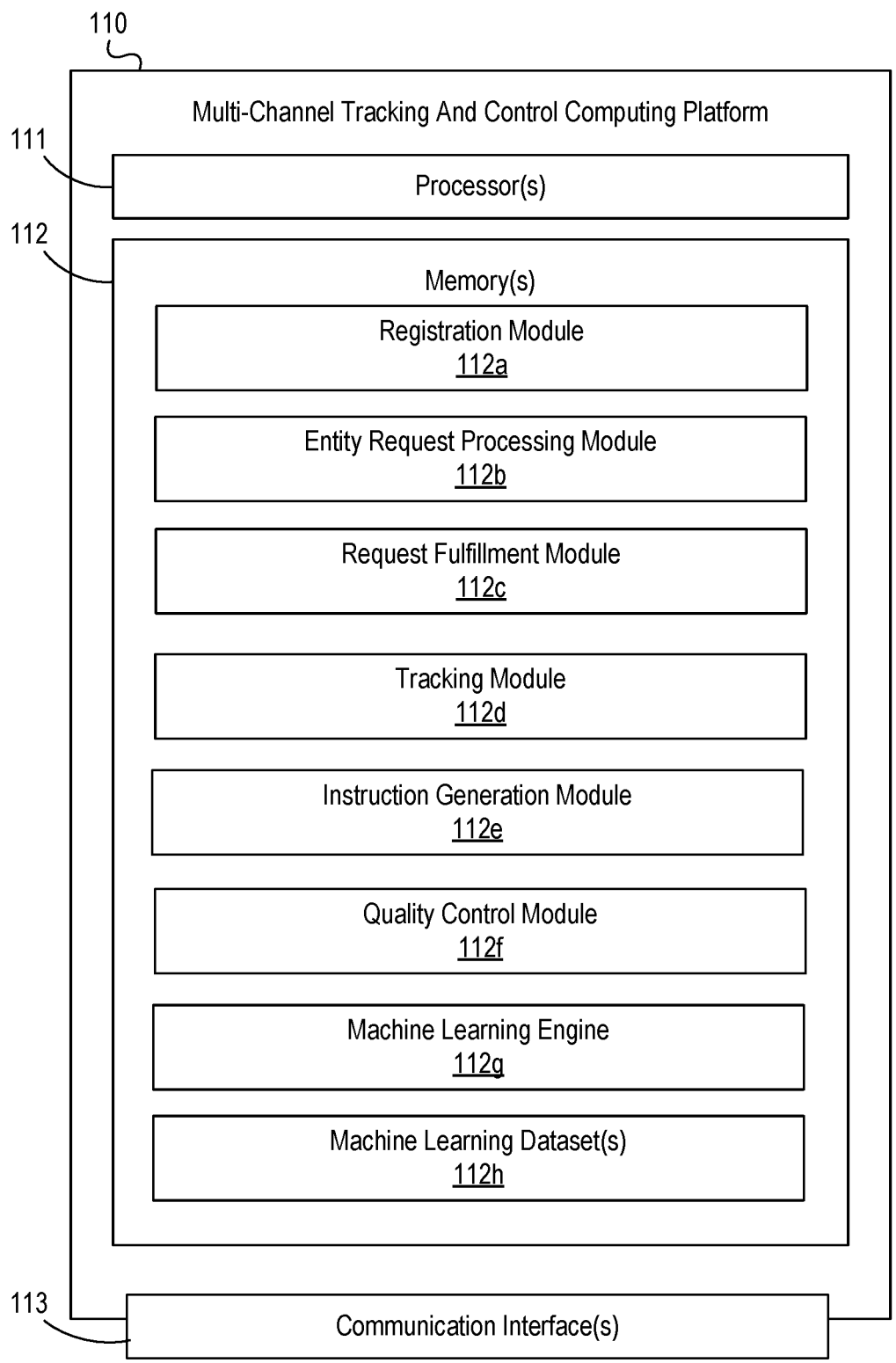

FIGS. 1A-1B depict an illustrative computing environment for implementing and using a system for multi-channel tracking and control in accordance with one or more aspects described herein. Referring to FIG. 1A, computing environment 100 may include one or more computing devices and/or other computing systems. For example, computing environment 100 may include multi-channel tracking and control computing platform 110 (implemented by a first entity), a second entity computing system 1 120, a second entity computing system 2 125, a first local user computing device 150, a second local user computing device 155, a first remote user computing device 170, and a second remote user computing device 175. Although two computing systems 120, 125 associated with the second entity are shown in FIG. 1A, more or fewer computing systems may be used without departing from the invention. Further, although computing systems 120, 125 are both associated with a single entity (e.g., second entity) computing systems associated with two or more entities may be used without departing from the invention.

Multi-channel tracking and control computing platform 110 may be configured to provide intelligent, dynamic, receipt and tracking of orders, products or shipments, as well as control of inventory, quality determinations and the like. For instance, a request for, for example, a first quantity of product may be received (e.g., by the multi-channel tracking and control computing platform 110). The order may be received from second entity computing system 1 120. The order may be processed and an order may be generated including the requested first quantity of product. The order may then be transmitted to a receiving location and product within the order may be tracked during shipment. For instance, the order may include radio frequency identification or other tracking systems to enable tracking of the device through one or more checkpoints along a shipping route. In some examples, the tracking may be shown in real-time or near real-time on an interactive map.

Upon receiving confirmation of receipt of the product, the multi-channel tracking and control computing platform 110 may generate an instruction updating an inventory associated with the requested product. For instance, the multi-channel tracking and control computing platform 110 may generate an instruction causing a value of current inventory at the second entity to be increased by the first quantity of product. The instruction may then be transmitted to a computing system at the second entity, such as second entity computing system 2 125. In some examples, the instruction may be transmitted to a computing system of the second entity different from the computing system of the second entity from which the request for product was received. Additionally or alternatively, the instruction may be transmitted to the same second entity computing system from which the request for product was received.

In some examples, receiving confirmation of receipt of the order and/or product may cause the multi-channel tracking and control computing platform 110 to generate, transmit and/or execute an instruction to process a financial transaction associated with the order.

In some examples, the multi-channel tracking and control computing platform 110 may use machine learning to predict when a second request for product may be received, an amount of product likely to be requested, and the like. In some examples, machine learning datasets may be generated and updated based on historical data associated with the second entity, current inventory data received from one or more second entity computing systems 120, 125, order information associated with the first entity and received from second entity computing system 1 120 and/or second entity computing system 2 125, and the like.

After predicting when a request for product will be received and/or an amount of product likely to be requested, a notification requesting instructions may be generated by the multi-channel tracking and control computing platform 110 to one or more of second entity computing system 1 120 and/or second entity computing system 2 125.

In some examples, data related to quality of the requested product may be received. For instance, infrared or other imaging technique may be used to evaluate a quality of product or of a shipping container associated with the product. In some examples, weight may be used to evaluate quality of a product, and the like. The quality information may be received by the multi-channel tracking and control computing platform 110 and a quality control score may be generated. In some examples, based on the quality control score, one or more terms associated with the request for product and/or associated payment may be modified. For instance, an amount of payment may be reduced based on the quality of the product being less than expected and, according, the instruction generated to process the financial transaction associated with the request may include a reduction in payment amount.

Second entity computing system 1 120 and second entity computing system 2 125, may be a computing device or plurality of devices suitable for hosting and/or executing one or more applications configured to process requests for orders or products, track inventory associated with the first entity, provide or authorize payment associated with an order to transaction, and the like. The second entity computing system 1 120 and second entity computing system 2 125 may be a same physical device and/or may be separate physical devices.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the multi-channel tracking and control computing platform 110, or the like to control parameters associated with the devices or systems, update or execute rules, modify settings and the like. In some examples, local user computing device 150, local user computing device 155, and the like may receive and display notifications.

The remote user computing device 170 and remote user computing device 175 may be used to communicate with, for example, one or more systems, computing platforms, devices, or the like, to receive and display one or more notifications, capture tracking information or data, capture quality data, and the like. Remote user computing devices 170, 175 may include user computing devices, such as mobile devices including smartphones, tablets, laptop computers, and the like, and/or desktop or other computing devices.

Computing environment 100 also may include one or more computing platforms. For example, and as noted above, computing environment 100 may include multi-channel tracking and control computing platform 110. As illustrated in greater detail below, multi-channel tracking and control computing platform 110 may include one or more computing devices configured to perform one or more of the functions described herein. For example, multi-channel tracking and control computing platform 110 may include one or more computers (e.g., laptop computers, desktop computers, servers, server blades, or the like).

As mentioned above, computing environment 100 also may include one or more networks, which may interconnect one or more of multi-channel tracking and control computing platform 110, second entity computing system 1 120, second entity computing system 2 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, multi-channel tracking and control computing platform 110, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect multi-channel tracking and control computing platform 110, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., multi-channel tracking and control computing platform 110, local user computing device 150, local user computing device 155) with one or more networks and/or computing devices that are not associated with the organization. For example, second entity computing system 1 120, second entity computing system 2 125, remote user computing device 170, remote user computing device 175, might not be associated with an organization that operates private network 190 (e.g., because second entity computing system 1 120, second entity computing system 2 125, remote user computing device 170, remote user computing device 175, may be owned, operated, and/or serviced by one or more entities different from the organization (e.g., first entity) that operates private network 190, such as one or more customers of the organization, one or more employees of the organization, public or government entities, and/or vendors of the organization, rather than being owned and/or operated by the organization itself), and public network 195 may include one or more networks (e.g., the internet) that connect second entity computing system 1 120, second entity computing system 2 125, remote user computing device 170, remote user computing device 175, to private network 190 and/or one or more computing devices connected thereto (e.g., multi-channel tracking and control computing platform 110, local user computing device 150, local user computing device 155).

Referring to FIG. 1B, multi-channel tracking and control computing platform 110 may include one or more processors 111, memory 112, and communication interface 113. A data bus may interconnect processor(s) 111, memory 112, and communication interface 113. Communication interface 113 may be a network interface configured to support communication between multi-channel tracking and control computing platform 110 and one or more networks (e.g., private network 190, public network 195, or the like). Memory 112 may include one or more program modules having instructions that when executed by processor(s) 111 cause multi-channel tracking and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of multi-channel tracking and control computing platform 110 and/or by different computing devices that may form and/or otherwise make up multi-channel tracking and control computing platform 110.

For example, memory 112 may have, store and/or include a registration module 112*a*. Registration module may store instructions and/or data that may cause or enable the multi-channel tracking and control computing platform 110 to receive data related to one or more entities, entity computing systems, and the like. For instance, an entity (e.g., other than the entity (e.g., first entity) implementing the multi-channel tracking and control computing platform 110) may provide registration information such as identifying information, IP address for one or more devices or systems, applications executing on one or more devices or systems, payment or other financial transaction information, and the like. In response to receiving registration information, the multi-channel tracking and control computing platform 110, via the registration module 112*a*, may generate a data entry in a database to store the registration information associated with the entity. In some examples, registration information may be received from one or more entities.

Multi-channel tracking and control computing platform 110 may have, store and/or include an entity request processing module 112*b*. The entity request processing module 112*b* may store instructions and/or data that may cause or enable the multi-channel tracking and control computing platform 110 to receive a request for one or more quantities of product or other orders. For instance, the multi-channel tracking and control computing platform 110 may receive, from one or more computing devices or systems of other entities (e.g., second entity or entities other than the first entity implementing the multi-channel tracking and control computing platform 110) a request for product. In some examples, the request for product may be fulfilled by the first entity implementing the multi-channel tracking and control computing platform 110. Additionally or alternatively, the request for product may be fulfilled by a third party (e.g., an entity other than the requesting entity (e.g., second entity) and the entity implementing the multi-channel tracking and control computing platform 110 (e.g., first entity)).

In some examples, receiving the request may include information related to the request, such as a quantity of product, shipping information, quality expectations, agreed upon financial terms for the order, and the like. Additionally or alternatively, data may be extracted from pre-stored registration data related to order parameters (e.g., costs, shipping expectations, payment expectations, and the like).

Multi-channel tracking and control computing platform 110 may further have, store and/or include a request fulfillment module 112*c*. Request fulfillment module 112*c* may store instructions and/or data that may cause or enable the multi-channel tracking and control computing platform 110 to generate an instruction to fulfill the request received by the entity request processing module 112b. For instance, in response to receiving the request, the request fulfillment module 112c may generate an instruction to execute one or more processes in order to fulfill the request. The one or more processes may include identifying, gathering and/or shipping requested products, either by the entity implementing the multi-channel tracking and control computing platform 110 or another fulfilling entity (e.g., by transmitting the instruction to a computing device of that entity for execution).

Multi-channel tracking and control computing platform 110 may further have, store and/or include tracking module 112d. Tracking module 112d may store instructions and/or data that may cause or enable the multi-channel tracking and control computing platform 110 to receive and process, in at least some examples, in real-time or near real-time, tracking data related to an order that has shipped to a requesting entity. For instance, an order or portions of an order may include radio frequency identification (RFID) devices that may be detected at one or more locations along a shipping route. The detection of the RFID devices may be processed and transmitted to the multi-channel tracking and control computing platform 110 in order to process and understand the status of an order, determine when an order has been received, and the like. This information may be used by the multi-channel tracking and control computing platform 110 to detect delivery of an order in order to automatically generate, transmit and/or execute instructions to process a financial transaction associated with the order, update inventory on an entity system, or the like.

Multi-channel tracking and control computing platform 110 may further have, store and/or include instruction generation module 112e. Instruction generation module 112e may store instructions and/or data that may cause or enable the multi-channel tracking and control computing platform 110 to generate an instruction to process a payment, an instruction to modify parameters or a payment or payment agreement (e.g., based on a determined quality), an instruction to update a real-time inventory of a receiving entity, or the like. In some examples, machine learning may be used to generate one or more instructions. Further, the instruction generation module 112e may, in some examples, generate one or more notifications that may be transmitted for display on one or more computing devices (e.g., local user computing devices 150, 155, remote user computing devices 170, 175, entity computing systems 120, 125, or the like). In some examples, the notifications may include an order status, a summary of an instruction being executed, a projected future order and request for instructions, and the like.

Multi-channel tracking and control computing platform 110 may further have, store and/or include a quality control module 112f. Quality control module 112f may store instructions and/or data that may cause or enable the multi-channel tracking and control computing platform 110 to generate and/or transmit an instruction to capture quality evaluation data. For instance, an instruction to initiate one or more sensors, systems, cameras or other imaging devices, or the like, at a location remote from the multi-channel tracking and control computing platform 110 (e.g., at a delivery site of the order) may be generated and transmitted. The instruction may be executed by one or more devices (e.g., remote user computing device 170, 175) to capture quality data. In some examples, the quality data may include measurements of the container in which the product arrived. The measurements may be compared to measurements captured prior to shipping to determine whether damage to the shipping container occurred in transit. In another example, the quality data may include infrared data associated with the product shipped. The infrared data may indicate whether the product has deteriorated beyond an acceptable point based on a comparison of the data to one or more threshold values. In some examples, the received product may be weighed and the weight may be compared to a pre-stored weight captured prior to shipping the product to determine whether the correct number of goods are present at delivery. Various other data quality metrics may be used without departing from the invention.

In some examples, the quality control module 112f may calculate or otherwise determine a quality control score or quotient. The quality control score or quotient may be based on the received quality data and may indicate whether the product meets acceptable or predefined quality standards upon delivery. If so, a payment may be processed as agreed. If not, one or more parameters of the payment agreement may be modified to account for the reduced quality in the product.

Multi-channel tracking and control computing platform 110 may further have, store and/or include a machine learning engine 112g and machine learning datasets 112h. Machine learning engine 112g and machine learning datasets 112h may store instructions and/or data that may cause or enable multi-channel tracking and control computing platform 110 to receive historical data, receive inventory data (e.g., current and/or real-time data), receive quality data, receive order tracking data, and the like and analyze the data to predict timing of future orders, predict quantity of future orders, adjust payment agreement terms, and the like.

Machine learning engine 112g may identify patterns in the received data to predict future orders or order parameters. The machine learning datasets 112h may be generated based on previously analyzed data (e.g., data from previously received data, historical data, and the like), raw data, and/or received from one or more outside sources.

The machine learning engine 112g may receive data related to orders, quality, tracking, and the like and, using one or more machine learning algorithms, may generate and/or update or validate one or more machine learning datasets 112h. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112g may analyze data to identify patterns of activity, sequences of activity, and the like, to generate one or more machine learning datasets 112h.

Based on the generated machine learning datasets 112h, one or more order predictions may be generated. For instance, based on previous orders, current order tracking, inventory data, and the like, a prediction may be generated, based on the machine learning datasets 112h, of when a future order is likely to be requested, a quantity of the future order, what a quality threshold should be for the future order, and the like. The predictions or other outcomes may be included one or more notifications (e.g., generated by the instruction tracking module 112*e*) and may be transmitted to one or more computing devices for display, response, and the like.

FIGS. 2A-2H depict one example illustrative event sequence for implementing and using multi-channel tracking and control in accordance with one or more aspects described herein. The events shown in the illustrative event sequence are merely one example sequence and additional events may be added, or events may be omitted, without departing from the invention.

Figure 2A:
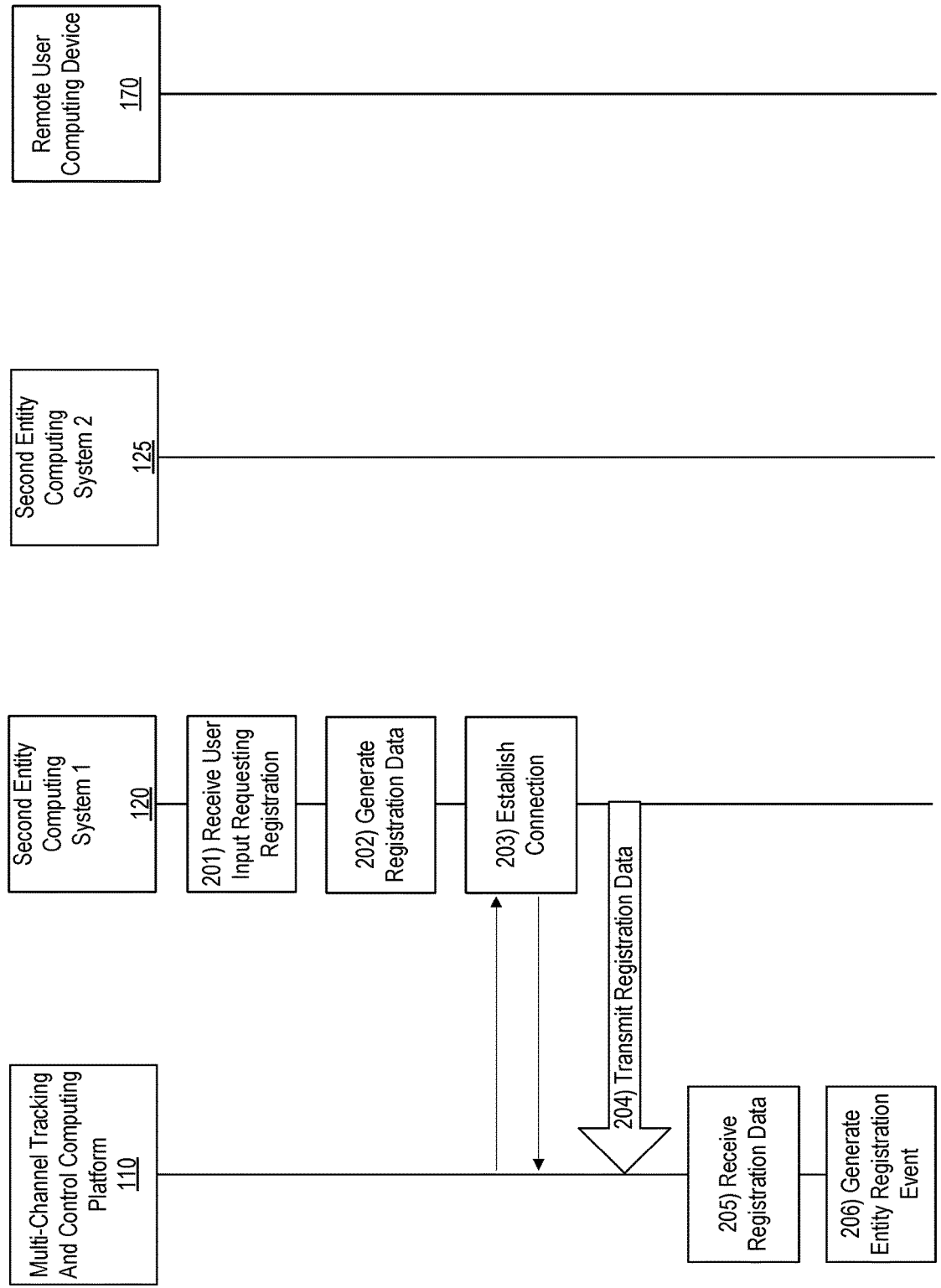

Referring to FIG. 2A, at step 201, user input requesting registration may be received. For instance, a user associated with a second entity and an associated second entity computing system 1 120 may provide user input requesting registration of the second entity, second entity computing system 1 120, and the like, with the multi-channel tracking and control computing platform 110 and/or an entity (e.g., a first entity) implementing the multi-channel tracking and control computing platform 110. In some examples, the user input may include second entity identifying information, account or other payment information, purchase order parameters, billing information, and the like.

At step 202, registration data may be generated. In some examples, the registration data may include the second entity information, and the like, provided by the user, as well as data identifying one or more computing systems or devices, such as an internet protocol (IP) address, media access control (MAC) address, and the like. In some examples, the registration data may include permissions to access one or more computing devices or systems of the second entity (e.g., second entity computing system 1 120, second entity computing system 2 125, and the like). Further, the registration data may include data associated with applications executing on one or more second entity computing systems, such as second entity computing system 1 120, second entity computing system 2 125, and the like. For example, applications executing to control purchasing, inventory tracking, delivery, billing, payment, and the like, may be identified via the generated registration data.

At step 203, a connection may be established between the second entity computing system 1 120 and the multi-channel tracking and control computing platform 110. For instance, a first wireless connection may be established between the multi-channel tracking and control computing platform 110 and second entity computing system 1 120. Upon establishing the first wireless connection, a communication session may be initiated between multi-channel tracking and control computing platform 110 and second entity computing system 1 120.

At step 204, the generated registration data may be transmitted from the second entity computing system 1 120 to the multi-channel tracking and control computing platform 110. For instance, the generated registration data may be transmitted during the communication session initiated upon establishing the first wireless connection.

At step 205, the registration data may be received by the multi-channel tracking and control computing platform 110 and, at step 206, an entity registration event may be generated. The entity registration event may include modifying a database to add an event or entry including the second entity information, registration information, and the like. In some examples, the registration data may be stored in, for example, a lookup table such that payment parameters, billing information, and the like, may be accessed via the lookup table.

Figure 2B:
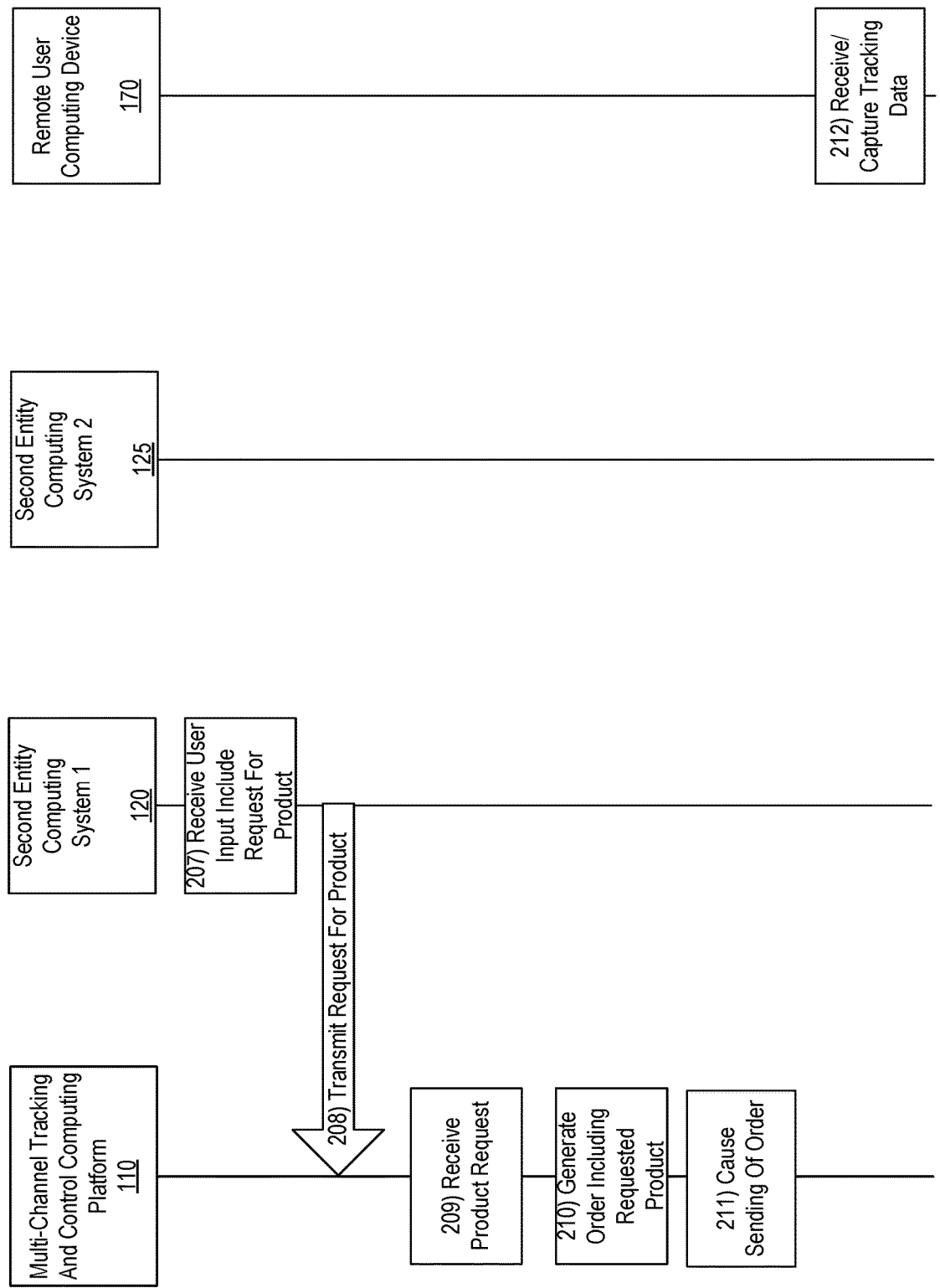

With reference to FIG. 2B, at step 207, user input including a request for product may be received by, for example, second entity computing system 1 120. The request for product may include a quantity of product requested, delivery date requested, payment parameters, and the like. At step 208, the request for product may be transmitted from the second entity computing system 1 120 to the multi-channel tracking and control computing platform 110. In some examples, the request may be transmitted during the communication session established upon initiating the first wireless connection. Alternatively, the request may be transmitted via a later established communication session between the second entity computing system 1 120 and the multi-channel tracking and control computing platform 110.

At step 209, the product request may be received by the multi-channel tracking and control computing platform 110 and analyzed. Analyzing the request for product may include extracting or evaluating one or more parameters of the request (e.g., quantity, preferred supplier, timing, or the like).

At step 210, an order including the requested product may be generated. In some examples, the order may be executed by the entity implementing the multi-channel tracking and control computing platform 110 (e.g., the first entity). Additionally or alternatively, the order may be executed by another entity, such as a third entity. Generating the order may include generating a signal, command or instruction to execute the order.

At step 211, the generated instruction, signal or command may be executed, thereby causing the order to execute or ship. After causing the order to ship, tracking data may be received or captured by a remote user computing device 170 at step 212. For instance, one or more remote user computing devices 170, 175, may be physically distributed along a shipping route of the order. As the order is detected within a predefined distance of the remote user computing device (e.g., remote user computing device 170), tracking or location information may be captured and used to identify a current, real-time location of the order or product within the order. As discussed herein, the location or tracking data may be captured via RFID, global positioning system, or the like. Although tracking data is shown as being captured via one remote user computing device (e.g., remote user computing device 170), two or more remote user computing devices may be used to capture location data at a plurality of locations along the shipping route without departing from the invention. One remote user computing device is shown for simplicity.

Figure 2C:
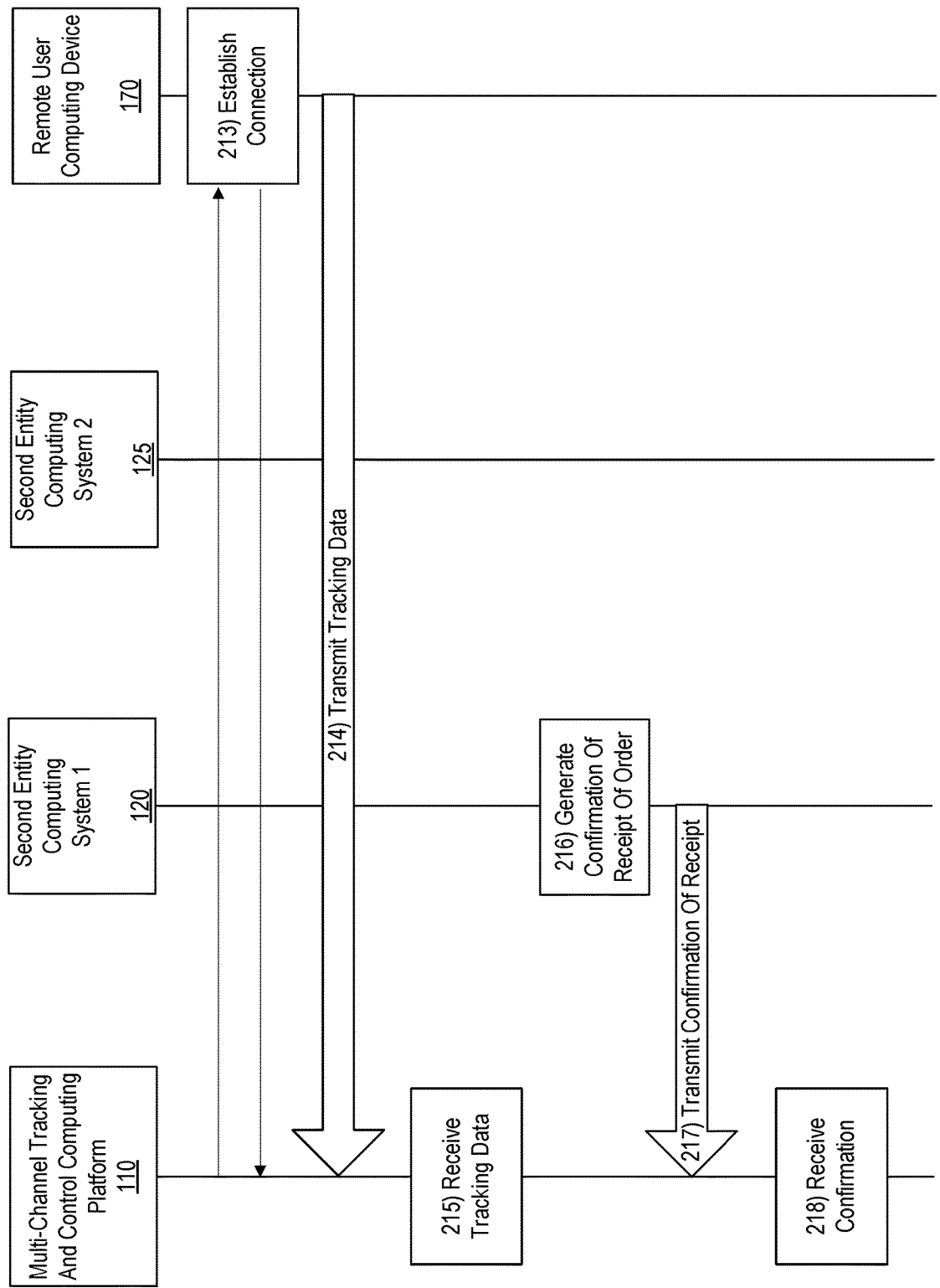

With reference to FIG. 2C, at step 213, a connection may be established between the remote user computing device 170 and the multi-channel tracking and control computing platform 110. For instance, a second wireless connection may be established between the multi-channel tracking and control computing platform 110 and remote user computing device 170. Upon establishing the second wireless connection, a communication session may be initiated between multi-channel tracking and control computing platform 110 and remote user computing device 170.

At step 214, the captured/received tracking data may be transmitted from the remote user computing device 170 to the multi-channel tracking and control computing platform 110. For instance, the tracking data may be transmitted during the communication session established upon initiating the second wireless connection.

At step 215, the tracking data may be received by the multi-channel tracking and control computing platform 110 and analyzed to determine whether the order was delivered. For instance, tracking data received at each point along a shipping route may be evaluated to determine whether the current location of the order matches the location of the final delivery. If so, the multi-channel tracking and control computing platform 110 may identify that the order has been delivered.

In some examples, delivery may be confirmed by the second entity. For instance, at step 216, a confirmation of receipt of the order may be generated by the second entity computing system 1 120. At step 217, the confirmation may be transmitted from the second entity computing system 1 120 to the multi-channel tracking and control computing platform 110. At step 218, the confirmation may be received by the multi-channel tracking and control computing platform 110.

Figure 2D:
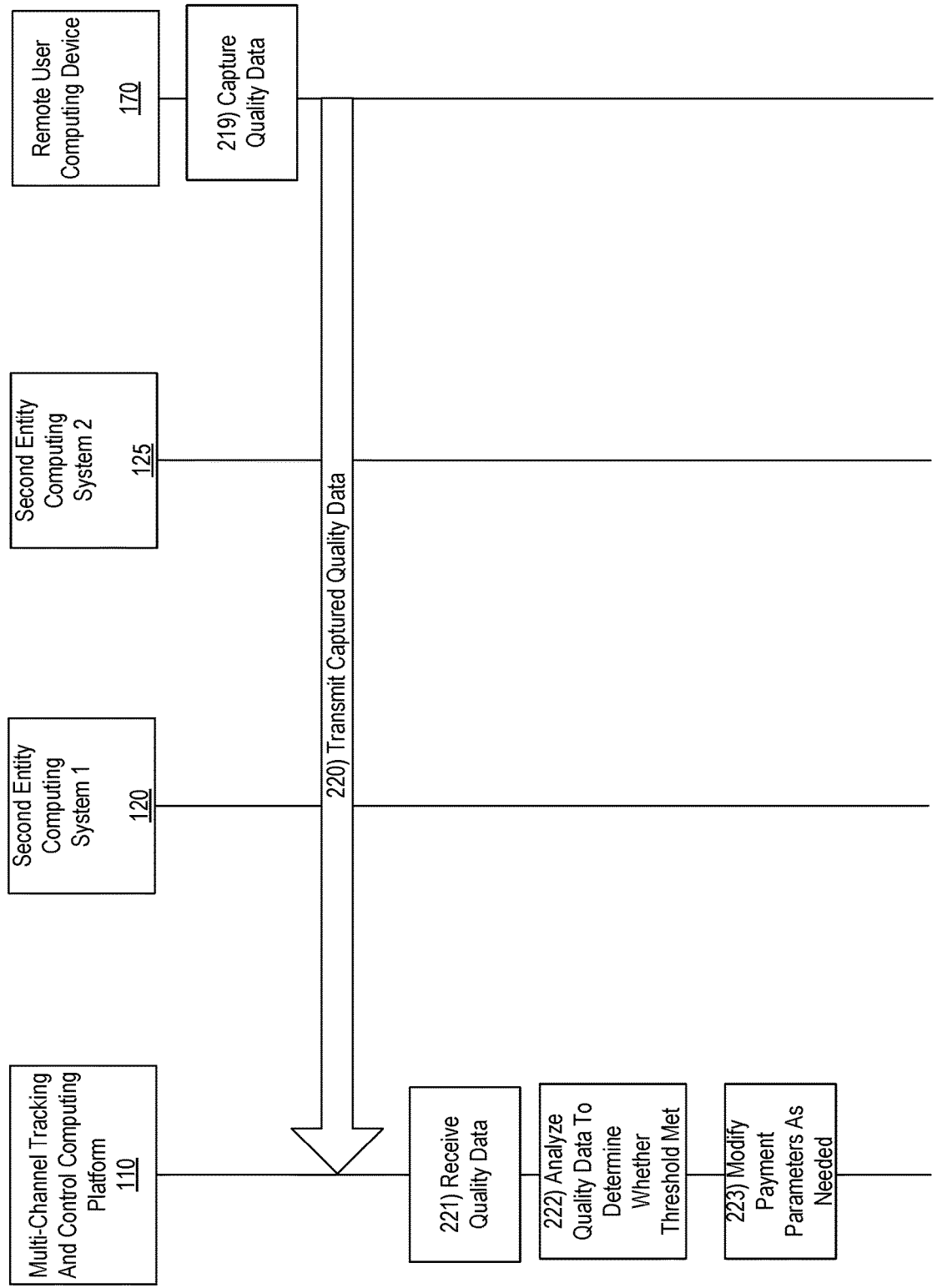

With reference to FIG. 2D, at step 219, quality data may be captured by one or more computing devices, such as remote user computing device 170. In some examples, quality data may be captured by one or more devices that may capture or transmit tracking data. In other examples, the quality data may be captured by a different device. The quality data may be captured by a device located at a delivery location of the order.

As discussed herein, quality data may include weight associated with the order, shape or dimension data, infrared data, and the like. For instance, infrared may be used as a non-destructive measure of quality of an order of food products. In some examples, the infrared analysis may evaluate or measure reflection, transflection, transmission and interaction of infrared to determine a quality of the food or other product. The measurements may be captured and compared to one or more thresholds to determine whether the quality of the delivered product is as expected.

In another example, lasers may be used to evaluate a shape of a package to determine whether there was damage during shipping. For instance, irregularities in a surface of the package may be detected through laser or other image analysis and may be used to determine quality.

In yet another example, the order may be weighed to determine whether all portions of the order are present. This value may be conveyed and compared to a pre-shipping weight to determine whether the weight is as expected or within a threshold.

In some examples, each order or product within an order may be assigned a unique identifier or delivery identifier number. In some examples, quality data may be measured or otherwise determined for each item associated with a delivery identifier number.

At step 220, the captured quality data (e.g., measurement data, delivery identifier numbers, and the like) may be transmitted from the remote user computing device 170 to the multi-channel tracking and control computing platform 110. At step 221, the quality data may be received by the multi-channel tracking and control computing platform 110.

At step 222, the quality data may be analyzed to determine whether one or more thresholds are met. For instance, received quality measurements may be compared to pre-stored or expected measurements to determine whether the quality data is within an acceptable threshold range. In some examples, analyzing the quality data may include determining a quality score quotient for each order or each item having a delivery identifier number. The quality score quotient may be based on whether the quality data is within an acceptable range (e.g., it may be a binary value 1 or 0 depending on whether it meets a threshold standard, it may be a value representing a measurement or difference between a measured value and an expected value, or the like).

Based on the analysis of the quality data, a determination may be made as to whether payment parameters associated with the order should be modified. For instance, if the quality of the delivered order is less than expected or acceptable, the agreed upon price may be reduced by a corresponding or predefined amount or percentage. If the quality is as expected, the parameters might not be modified. In some examples, the agreed upon price may be paid regardless of quality level but an additional payment or "tip" may be automatically applied if the quality meets or exceeds a predetermined threshold or quality control quotient.

Figure 2E:
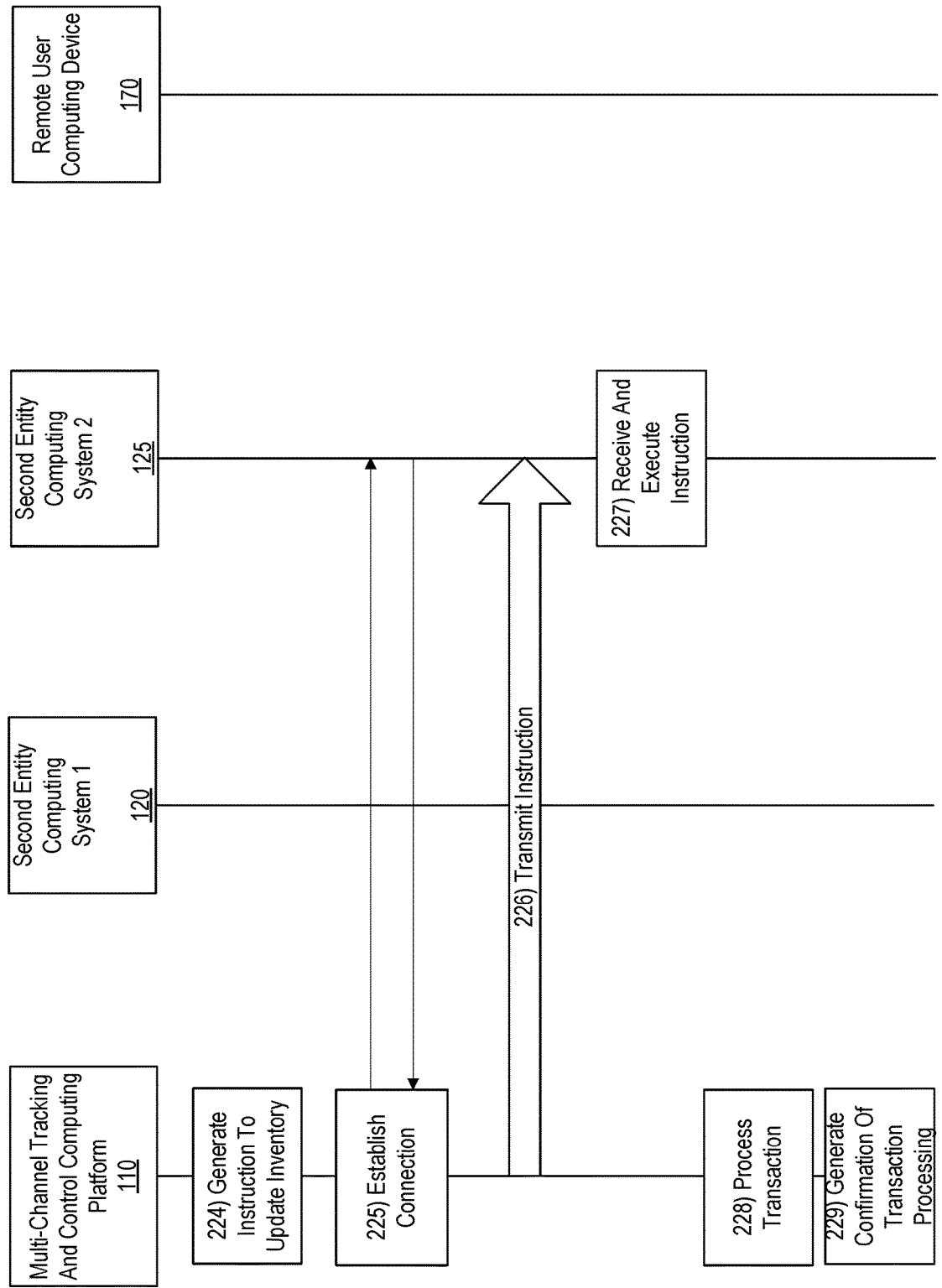

With reference to FIG. 2E, at step 224, the multi-channel tracking and control computing platform 110 may generate an instruction to update inventory on a second entity system. For instance, based on the detected and/or confirmed delivery of the order, the multi-channel tracking and control computing platform 110 may generate a signal, instruction or command configured to cause an inventory system of the second entity to update. For instance, the instruction may cause a quantity of product in an inventory system of the second entity to be increased or decreased based on delivery of the order.

At step 225, a connection may be established between the multi-channel tracking and control computing platform 110 and a second computing system of the second entity, such as second entity computing system 2 125 (e.g., a computing system different from the second entity computing system 1 120 from which the request for product was received). For instance, a third wireless connection may be established between the multi-channel tracking and control computing platform 110 and second entity computing system 2 125. Upon establishing the third wireless connection, a communication session may be initiated between multi-channel tracking and control computing platform 110 and second entity computing system 2 125.

At step 226, the generated instruction may be transmitted from the multi-channel tracking and control computing platform 110 to the second entity computing system 2 125. For instance, the generated instruction may be transmitted during the communication session established upon initiating the third wireless connection.

At step 227, the instruction may be received by second entity computing system 2 125 and may be executed by second entity computing system 2 125. Executing the instruction may cause an inventory system or application executing on the second entity computing system 2 125 to adjust a quantity of inventory of product based on delivery of the order including the requested quantity of product.

At step 228, a financial transaction associated with the order may be proceed. For instance, funds may be transferred from one or more account of the second entity to an account of the entity providing the product (e.g., the first entity, third entity, or the like). In some examples, processing the transaction may include generating an instruction by the multi-channel tracking and control computing platform 110 to cause transfer of the funds. In some examples, the instruction may include any modifications made to payment parameters based on the determined quality of the delivered product.

At step 229, a confirmation or notification of transaction processing may be generated by the multi-channel tracking and control computing platform 110.

Figure 2F:
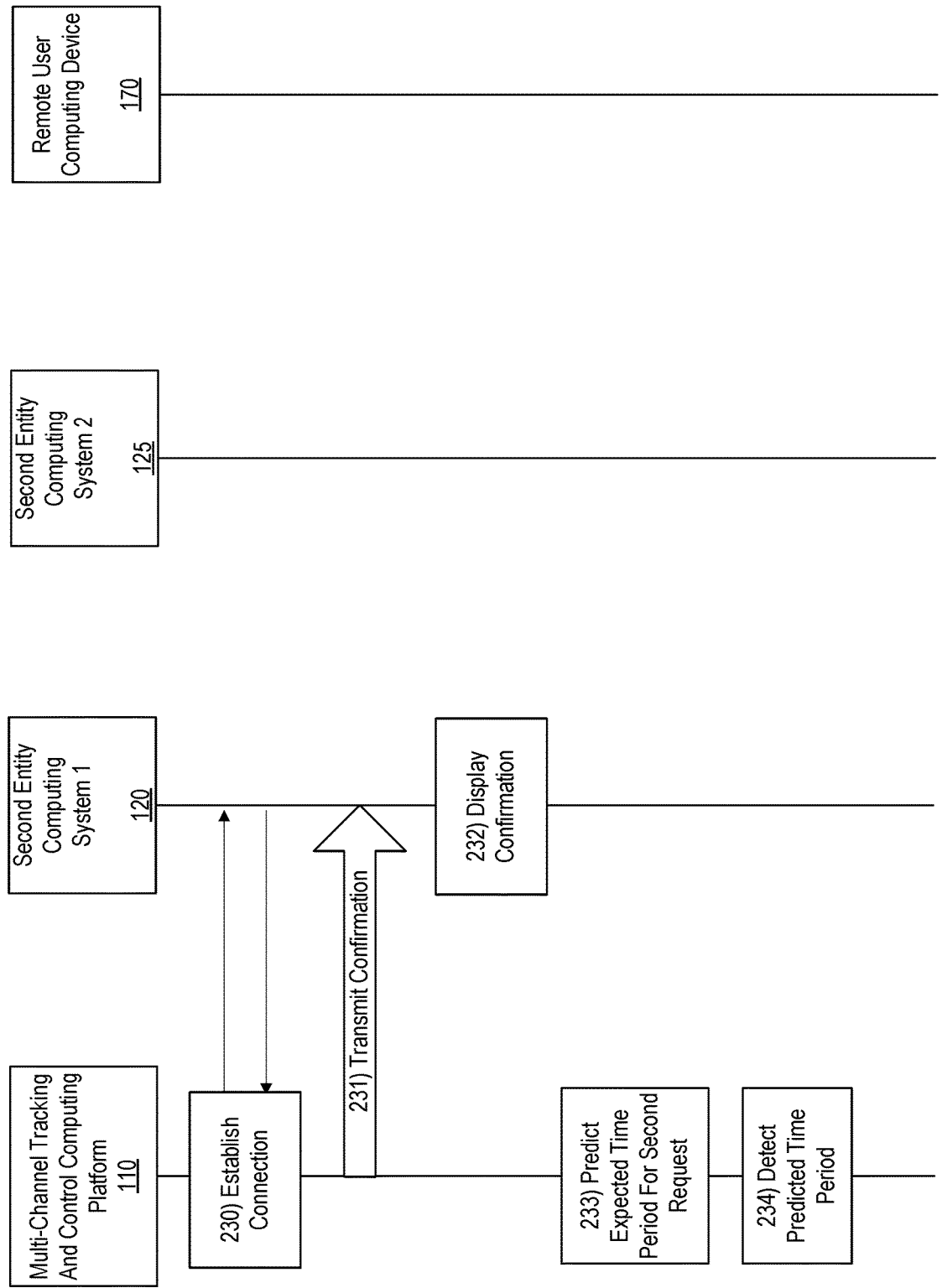

With reference to FIG. 2F, at step 230, a connection may be established between the multi-channel tracking and control computing platform 110 and second entity computing system 1 120. For instance, a fourth wireless connection may be established between the multi-channel tracking and control computing platform 110 and second entity computing system 1 120. Upon establishing the fourth wireless connection, a communication session may be initiated between multi-channel tracking and control computing platform 110 and second entity computing system 1 120.

At step 231, the generated confirmation may be transmitted from the multi-channel tracking and control computing platform 110 to the second entity computing system 1 120. At step 232, the confirmation may be displayed by a display of the second entity computing system 1 120.

At step 233, machine learning may be used to predict a time period or future time at which a second request for product may be received. For instance, one or more machine learning datasets may be used to analyze historical data, inventory data (e.g., current inventory data from the second entity), previous order data, and the like, to predict when the second entity may make a second or subsequent request for product.

At step 234, the predicted time period or future time may be detected by the multi-channel tracking and control computing platform 110 (e.g., the predicted time period may have elapsed).

With reference to FIG. 2G, at step 235, responsive to detecting the predicted time period, a notification may be generated. The notification may include a request for input from the second entity regarding whether a subsequent order for product will or should be placed. In some examples, the notification may include a proposed amount or quantity of product for the second request. In some arrangements, machine learning may be used to predict the proposed amount or quantity of product. For instance, historical data, seasonal adjustment data, inventory data, and the like, may be used to predict a proposed amount or quantity.

At step 236, a connection may be established between the multi-channel tracking and control computing platform 110 and second entity computing system 1 120. For instance, a fifth wireless connection may be established between the multi-channel tracking and control computing platform 110 and second entity computing system 1 120. Upon establishing the fifth wireless connection, a communication session may be initiated between multi-channel tracking and control computing platform 110 and second entity computing system 1 120.

At step 237, the generated notification and request for input may be transmitted from the multi-channel tracking and control computing platform 110 to the second entity computing system 1 120. At step 238, the notification may be received by the second entity computing system 1 120.

At step 239, response data may be generated by the second entity computing system 1 120. For instance, response data including an acceptance of a proposed offer and amount or quantity, an adjustment to quantity, or the like, may be generated. At step 240, the response data may be transmitted from the second entity computing system 1 120 to the multi-channel tracking and control computing platform 110.

Figure 2H:
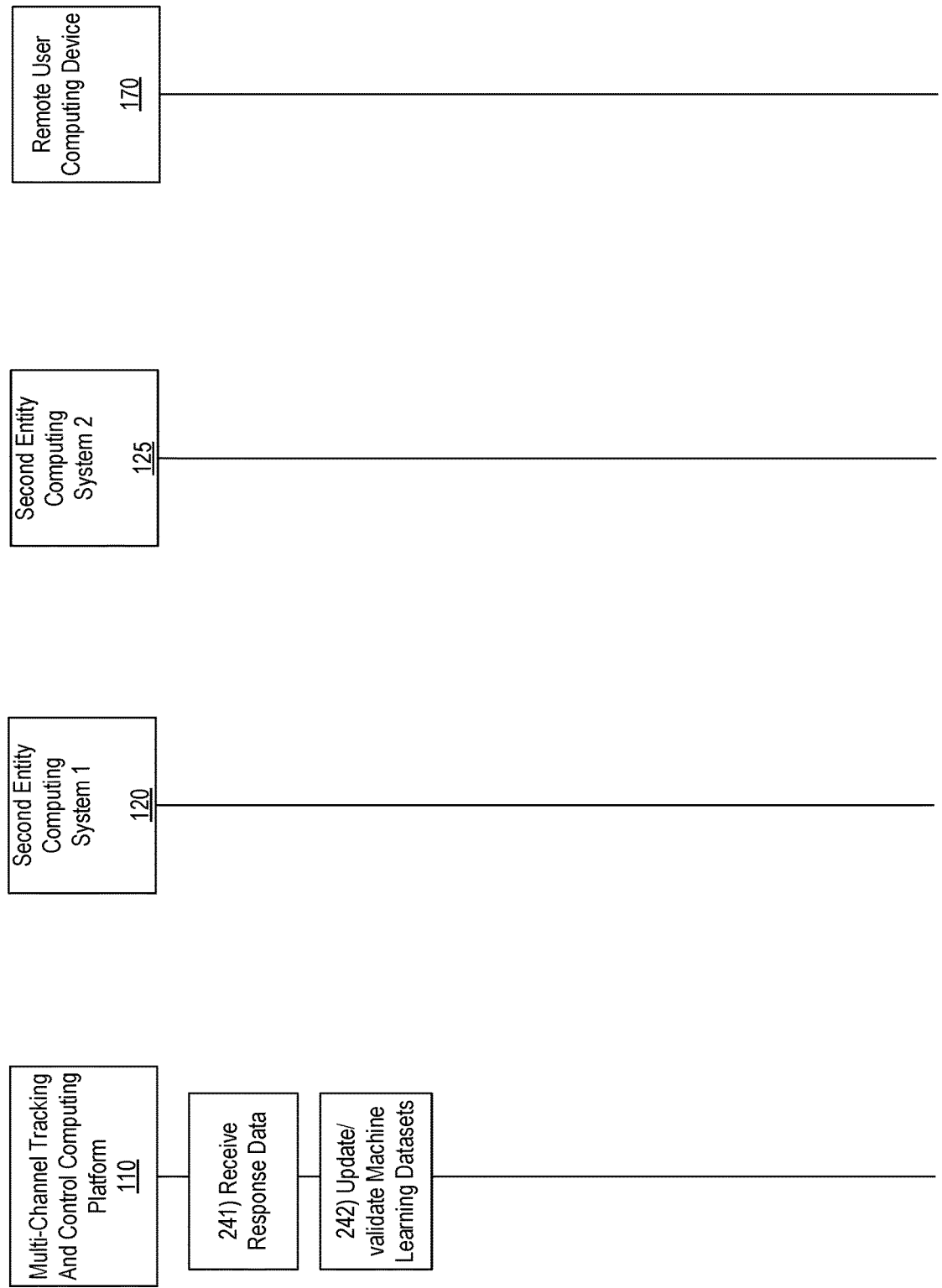

With reference to FIG. 2H, at step 241, the response data may be received by the multi-channel tracking and control computing platform 110 and may be analyzed to execute any request in the response data. Further, at step 242, one or more machine learning datasets may be validated and/or updated based on the received response data.

Figure 3:
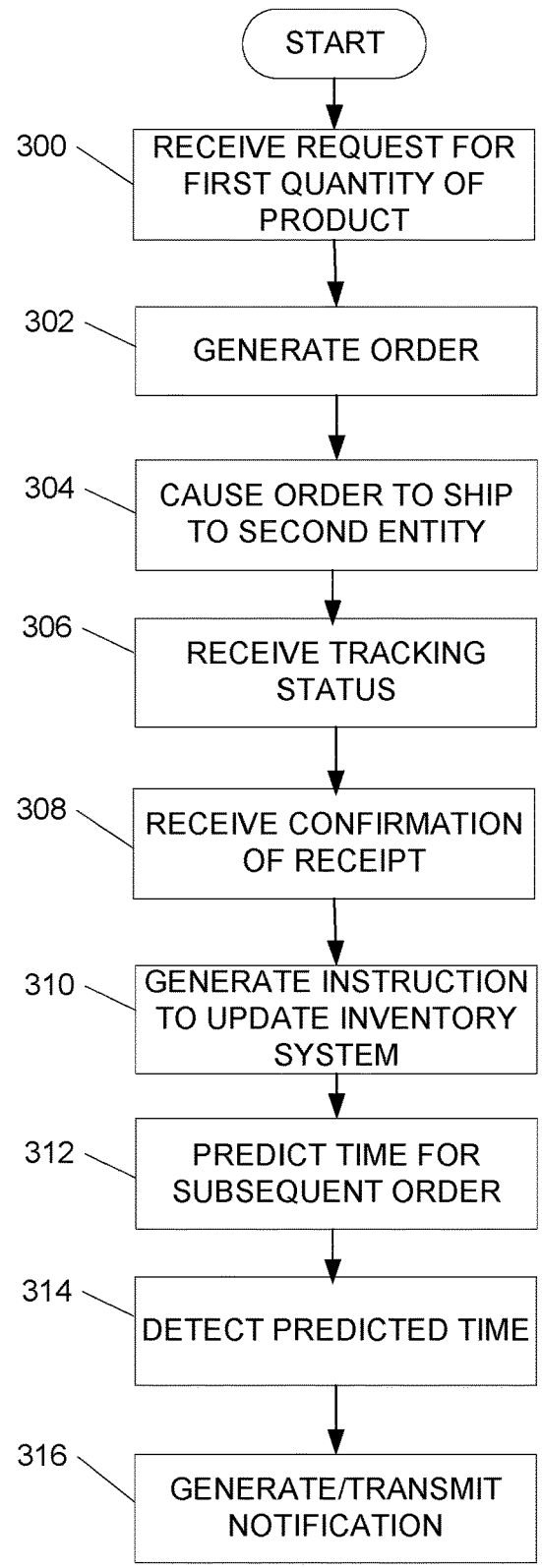
FIG. 3 depicts an illustrative method for implementing and using multi-channel tracking and control functions according to one or more aspects described herein.

FIG. 3 is a flow chart illustrating one example method of implementing multi-channel tracking and control according to one or more aspects described herein. The processes illustrated in FIG. 3 are merely some example processes and functions. The steps shown may be performed in the order shown, in a different order, more steps may be added, or one or more steps may be omitted, without departing from the invention.

At step 300, a request for a first quantity of product may be received. In some examples, the request may be received from a second entity or second entity computing system, such as second entity computing system 1 120, and received by a first, different entity, such as an entity implementing the multi-channel tracking and control computing platform 110.

At step 302, an order for the requested product may be generated. In some examples, the order may be generated and fulfilled by the second entity. Additionally or alternatively, the order may be generated by the second entity and fulfilled by a third or other entity.

At step 304, the order may be shipped or otherwise transmitted to the second entity. In some examples, the multi-channel tracking and control computing platform 110 may generate an instruction or command causing the order to ship.

At step 306, tracking status of the order may be received. For instance, tracking data may be received from one or more locations along a shipping route of the order from the origin to the destination. The tracking data may include location data captured via RFID, GPS, or the like.

At step 308, confirmation that the order was received by the second entity may be received by the multi-channel tracking and control computing platform 110. Responsive to receiving confirmation, a transaction associated with the order may be processed (e.g., by the multi-channel tracking and control computing platform 110, or the like).

At step 310, an instruction to update inventory on a second entity system may be generated and transmitted to a second entity computing system. In some examples, the instruction may be transmitted to a second entity computing system different from the second entity computing system from which the request for product was received. The instruction may be executed by the system and an inventory may be updated.

At step 312, machine learning may be used to predict a future time or time period in which the second entity is likely to request additional product (e.g., place a second order). At step 314, the multi-channel tracking and control computing platform 110 may detect that the future time has arrived or that the time period has lapsed.

Responsive to detecting that the future time has arrived or that the time period has lapsed, a notification may be generated and transmitted to the second entity. For instance, a notification including a recommendation to place an order or request for product, a recommended amount or quantity of product, and the like, may be generated by the multi-channel tracking and control computing platform 110 and transmitted to the second entity computing system.

Figure 4:
FIG. 4 illustrates one example user interface that may be generated in accordance with one or more aspects described herein.

FIG. 4 illustrates one example notification including a recommendation to request additional product according to one or more aspects described herein. The notification includes a user interface 400 identifying a recommendation to place an order for product x. In addition, the user interface includes a recommended quantity of product x (e.g., quantity y) and includes the justification for the recommended quantity (e.g., approaching holiday season). As indicated above, machine learning may be used to generate one or more of these recommendations.

If the second entity would like to place this order, a user may select "OK" option and response data may be generated and transmitted to the multi-channel tracking and control computing platform 110 for processing. Alternatively, the user may select "MODIFY" option and may modify a timing, quantity, refuse or reject the recommendation, or the like.

As discussed herein, multi-channel tracking and control functions may be used to facilitate all aspects of various work processes in order to improve efficiency and reduce errors. Various aspects discussed herein are related to use of the system for purchasing, order tracking, quality control, payment facilitation and the like. For instance, as discussed above, orders may be received by the multi-channel tracking and control computing platform, the orders may be fulfilled by the multi-channel tracking and control computing platform, quality of the product may be evaluated by the multi-channel tracking and control computing platform, payment may be facilitated by the multi-channel tracking and control computing platform (e.g., including debiting or crediting one or more accounts of one or more parties to the transaction), updating an controlling inventory may be performed by multi-channel tracking and control computing platform, and the like. Accordingly, all functions associated with the order may be facilitated via a single system retrieving data from a plurality of entity systems associated with the process. Accordingly, the multi-channel tracking and control computing platform may communicate across channels, interact with a plurality of devices, applications, and the like, to control the process from beginning to end, generate predictions and recommendations for future ordering, and the like.

As discussed herein, machine learning may be used to predict when additional orders should be placed, a quantity of order, and the like. The predictions may be based on historical data, current inventory or financial data (e.g., as retrieved from entity systems with permission of the entity), and the like. In some examples, recommendations may be generated based on time of year, anticipated increases or decreases in demand (e.g., based on publicly available data), and the like.

In some examples, the multi-channel tracking and control computing platform may monitor expected shelf life of a product and may generate recommendations based on timing, shelf life, and the like. For instance, if perishable goods are travelling via a less reliable system, any delay may cause the product to be unusable. Accordingly, the multi-channel tracking and control computing platform may track current location and status of the product and, if expiration is nearing, may recommend an alternate use for the product, may recommend an alternate route or shipping strategy, or the like.

Aspects described herein are related to use of infrared scans of product to evaluate quality. In some examples, an infrared scan may be performed at the source location and again at the destination location to compare measurements obtained and identify any deterioration that may have occurred during shipping. The pre-shipping measurements may be stored by the multi-channel tracking and control computing platform for future comparison.

As discussed herein, the multi-channel tracking and control computing platform may facilitate payment associated with order processing. In some examples, this may include debiting and/or crediting one or more accounts of one or more parties to the transaction. Additionally or alternatively, this may include modifying one or more payment or agreement parameters based on a determined quality of the product upon arrival. For instance, a contract for purchase may indicate that at least a quality threshold of X % must be met or payment will be reduced by a certain percentage. The multi-channel tracking and control computing platform may facilitate modification and fulfillment of the appropriate payment. In another example, the multi-channel tracking and control computing platform may adjust a bank rate associated with a purchase based on a level of risk determined by the multi-channel tracking and control computing platform.

While various aspects described are directed to examples associated with purchasing product, the arrangements discussed herein may be used in various other arrangements as well. For example, the multi-channel tracking and control computing platform may detect that a user (e.g., based on a signal detected from a mobile device of a user) is with a plurality of other users (e.g., a predefined friend group) at a known location (e.g., a location frequented by the user). The multi-channel tracking and control computing platform may generate a notification offering to facilitate payment of a bill by one or more users at the location. In some examples, the location may be a restaurant having a system providing data input to the multi-channel tracking and control computing platform such that cost, order, and the like, information may be transmitted to the multi-channel tracking and control computing platform to facilitate recommendation generation, payment, and the like.

In some examples, a user may input items into, for example, an application executing on the multi-channel tracking and control computing platform such that the user is indicating items being purchased. In some arrangements, the user may indicate a retail location, restaurant, or the like, at which the purchase is being made and the multi-channel tracking and control computing platform may retrieve cost data associated with each item purchased, generate a total cost, transmit the cost to the user for confirmation, and/or facilitate transfer of funds to process the transaction.

In some examples, based on a detected location of a user or user device, the system may control data provided to the user for selection. For example, a registered user may have an identified peanut allergy. When the user is detected at a restaurant, the system may retrieve menu data from the restaurant, identify products that may conflict with the known allergy, filter those items out and present, to the user, only items that will not conflict with the known allergy. The user may also indicate particular items to filter, such as items not in line with the user's eating plan or the like.

Figure 5:
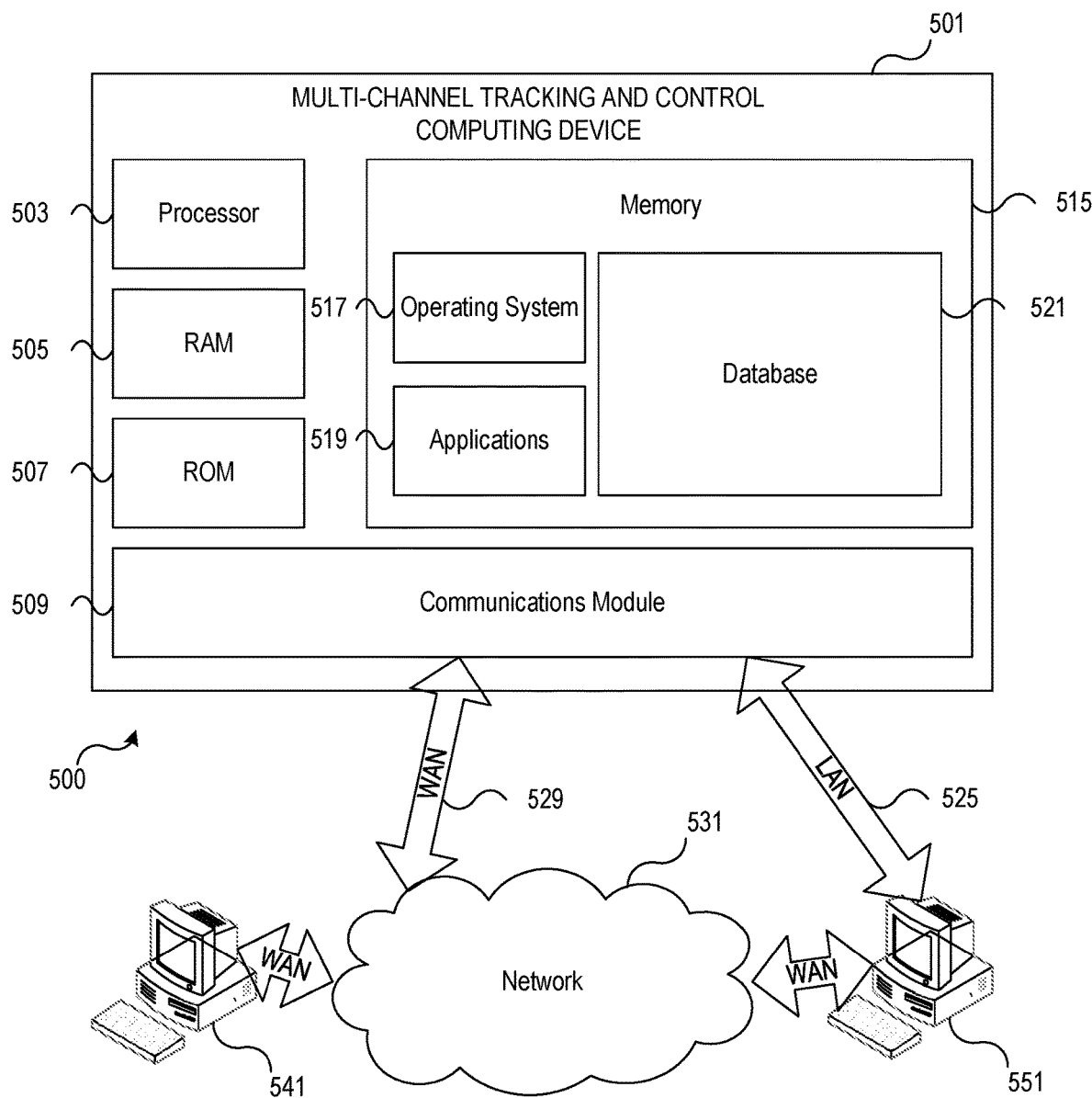
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include multi-channel tracking and control computing device 501 having processor 503 for controlling overall operation of multi-channel tracking and control computing device 501 and its associated components, including Random Access Memory (RAM) 505, Read-Only Memory (ROM) 507, communications module 509, and memory 515. Multi-channel tracking and control computing device 501 may include a variety of computer readable media. Computer readable media may be any available media that may be accessed by multi-channel tracking and control computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by multi-channel tracking and control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on multi-channel tracking and control computing device 501. Such a processor may execute computer-executable instructions stored on a computer-readable medium.

Software may be stored within memory 515 and/or storage to provide instructions to processor 503 for enabling multi-channel tracking and control computing device 501 to perform various functions as discussed herein. For example, memory 515 may store software used by multi-channel tracking and control computing device 501, such as operating system 517, application programs 519, and associated database 521. Also, some or all of the computer executable instructions for multi-channel tracking and control computing device 501 may be embodied in hardware or firmware. Although not shown, RAM 505 may include one or more applications representing the application data stored in RAM 505 while multi-channel tracking and control computing device 501 is on and corresponding software applications (e.g., software tasks) are running on multi-channel tracking and control computing device 501.

Communications module 509 may include a microphone, keypad, touch screen, and/or stylus through which a user of multi-channel tracking and control computing device 501 may provide input, and may also include one or more of a speaker for providing audio output and a video display device for providing textual, audiovisual and/or graphical output. Computing system environment 500 may also include optical scanners (not shown).

Multi-channel tracking and control computing device 501 may operate in a networked environment supporting connections to one or more remote computing devices, such as computing devices 541 and 551. Computing devices 541 and 551 may be personal computing devices or servers that include any or all of the elements described above relative to multi-channel tracking and control computing device 501.

The network connections depicted in FIG. 5 may include Local Area Network (LAN) 525 and Wide Area Network (WAN) 529, as well as other networks. When used in a LAN networking environment, multi-channel tracking and control computing device 501 may be connected to LAN 525 through a network interface or adapter in communications module 509. When used in a WAN networking environment, multi-channel tracking and control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
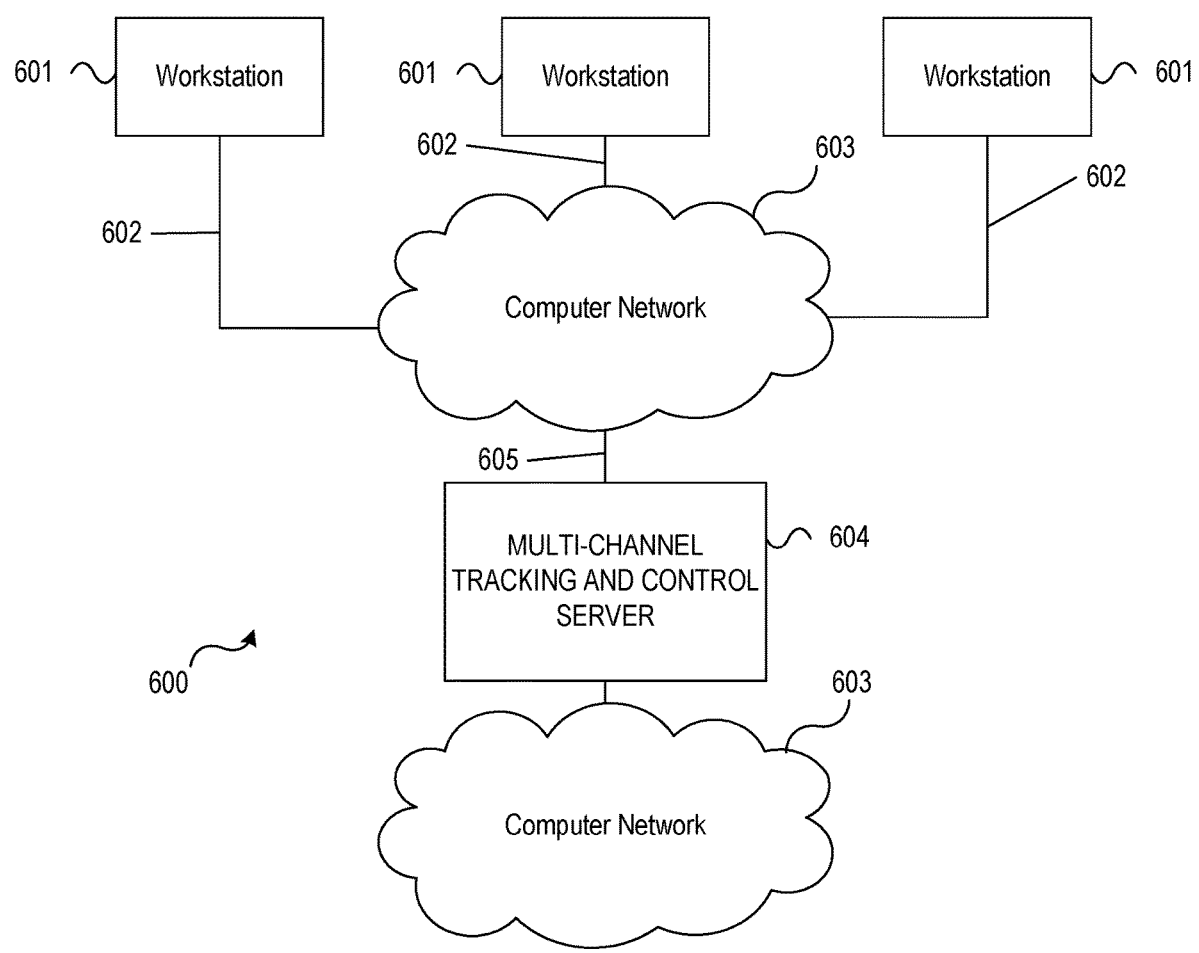
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to multi-channel tracking and control server 604. In system 600, multi-channel tracking and control server 604 may be a server, processor, computer, or data processing device, or combination of the same, configured to perform the functions and/or processes described herein. Server 604 may be used to receive and process requests for product, receive and analyze quality data, receive tracking data, facilitate payment, generate recommendations using machine learning, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and multi-channel tracking and control server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform associated with a first entity, comprising:
    at least one processor;
    a communication interface communicatively coupled to the at least one processor; and
    a memory storing computer-readable instructions that, when executed by the at least one processor, cause the computing platform to:
        generate one or more machine learning datasets based on identified patterns in received data;
        receive, from a first computing device associated with a second entity different from the first entity, a first request for a first quantity of product;
        generate, based on the first request for the first quantity of product, an order including the requested first quantity of product;
        transmit the order to the second entity;
        after transmitting the order, receiving, from a radio frequency identification device associated with the order, tracking data associated with a location of the order on a route between an origin and a destination;
        receive, from the first computing device associated with the second entity, confirmation of receipt of the order;
        generate an instruction updating inventory data for the second entity;
        transmit the generated instruction to a second computing device associated with the second entity and executing the generated instruction;
        predict, based on the one or more machine learning datasets, a future time at which a second request for a second quantity of product may be received;
        responsive to detecting that future time has occurred generate and transmit a notification to the first computing device of the second entity including a recommendation for placing the second request and requesting instructions for the placing the second request;
        receive, responsive to the notification requesting instructions, response data including an instruction to place the second request; and
        validate the one or more machine learning datasets based on the response data.

2. The computing platform of claim 1, wherein the first entity and the second entity are different entities.

3. The computing platform of claim 1, further including predicting, based on the one or more machine learning datasets, the second quantity of product.

4. The computing platform of claim 1, further including instructions that, when executed, cause the computing platform to:
    receive quality data associated with the product;
    analyze the quality data to determine whether the quality data meets an expected threshold; and
    generate a quality score for each item in the product.

5. The computing platform of claim 4, wherein the quality data includes data related to weight of the product at the destination.

6. The computing platform of claim 4, wherein one or more payment parameters associated with the order are modified based on the generated quality score.

7. A method, comprising:
    generating, by a computing device having at least one processor and associated with a first entity, one or more machine learning datasets based on identified patterns in received data;

receiving, by the at least one processor, and from a first computing device associated with a second entity different from the first entity, a first request for a first quantity of product;

generating, by the at least one processor and based on the first request for the first quantity of product, an order including the requested first quantity of product;

transmitting, by the at least one processor, the order to the second entity;

after transmitting the order, receiving, by the at least one processor and from a radio frequency identification device associated with the order, tracking data associated with a location of the order on a route between an origin and a destination;

receiving, by the at least one processor and from the first computing device associated with the second entity, confirmation of receipt of the order;

generating, by the at least one processor, an instruction updating inventory data for the second entity;

transmitting, by the at least one processor, the generated instruction to a second computing device associated with the second entity and executing the generated instruction;

predicting, by the at least one processor and based on the one or more machine learning datasets, a future time at which a second request for a second quantity of product may be received;

responsive to detecting that the future time has occurred, generating and transmitting a notification to the first computing device of the second entity including a recommendation for placing the second request and requesting instructions for the placing the second request;

receiving, by the at least one processor and responsive to the notification requesting instructions, response data including an instruction to place the second request; and validating, by the at least one processor, the one or more machine learning datasets based on the response data.

8. The method of claim 7, wherein the first entity and the second entity are different entities.

9. The method of claim 7, further including predicting, based on the one or more machine learning datasets, the second quantity of product.

10. The method of claim 7, further including:
receiving, by the at least one processor, quality data associated with the product;
analyzing, by the at least one processor, the quality data to determine whether the quality data meets an expected threshold; and
generating, by the at least one processor, a quality score for each item in the product.

11. The method of claim 10, wherein the quality data includes data related to weight of the product at the destination.

12. The method of claim 10, wherein one or more payment parameters associated with the order are modified based on the generated quality score.

13. One or more non-transitory computer-readable media storing instructions that, when executed by a computing device comprising at least one processor, memory, and a communication interface, cause the computing device to:
generate one or more machine learning datasets based on identified patterns in received data;
receive, from a first computing device associated with a second entity different from the first entity, a first request for a first quantity of product;
generate, based on the first request for the first quantity of product, an order including the requested first quantity of product;
transmit the order to the second entity;
after transmitting the order, receiving, from a radio frequency identification device associated with the order, tracking data associated with a location of the order on a route between an origin and a destination;
receive, from the first computing device associated with the second entity, confirmation of receipt of the order;
generate an instruction updating inventory data for the second entity;
transmit the generated instruction to a second computing device associated with the second entity and executing the generated instruction;
predict, based on the one or more machine learning datasets, a future time at which a second request for a second quantity of product may be received;
responsive to detecting that future time has occurred generate and transmit a notification to the first computing device of the second entity including a recommendation for placing the second request and requesting instructions for the placing the second request; and
receive, responsive to the notification requesting instructions, response data including an instruction to place the second request; and
validate the one or more machine learning datasets based on the response data.

14. The one or more non-transitory computer-readable media of claim 13, wherein the first entity and the second entity are different entities.

15. The one or more non-transitory computer-readable media of claim 13, further including instructions that, when executed, cause the computing device to predict, based on the one or more machine learning datasets, the second quantity of product.

16. The one or more non-transitory computer-readable media of claim 13, further including instructions that, when executed, cause the computing device to:
receive quality data associated with the product;
analyze the quality data to determine whether the quality data meets an expected threshold; and
generate a quality score for each item in the product.

17. The one or more non-transitory computer-readable media of claim 16, wherein the quality data includes data related to weight of the product at the destination.

18. The one or more non-transitory computer-readable media of claim 16, wherein one or more payment parameters associated with the order are modified based on the generated quality score.

* * * * *